(12) United States Patent
Trauth

(10) Patent No.: US 8,744,057 B2
(45) Date of Patent: Jun. 3, 2014

(54) METHOD AND APPARATUS FOR SHARING END USER FEEDBACK

(75) Inventor: Kurt Trauth, San Antonio, TX (US)

(73) Assignee: AT&T Intellectual Property I, LP, Atlanta, GA (US)

(*) Notice: Subject to any disclaimer, the term of this patent is extended or adjusted under 35 U.S.C. 154(b) by 1413 days.

(21) Appl. No.: 11/457,494

(22) Filed: Jul. 14, 2006

(65) Prior Publication Data

US 2008/0040194 A1    Feb. 14, 2008

(51) Int. Cl.
*H04M 3/42*    (2006.01)

(52) U.S. Cl.
USPC ..................... 379/202.01; 705/7.32

(58) Field of Classification Search
USPC .............. 379/212.01, 202.01; 705/7.32, 26.1, 705/26.7, 14.6, 347
See application file for complete search history.

(56) References Cited

U.S. PATENT DOCUMENTS

| | | | | |
|---|---|---|---|---|
| 5,694,120 A * | 12/1997 | Indekeu et al. | ............... | 340/7.23 |
| 5,918,214 A * | 6/1999 | Perkowski | ....................... | 705/27 |
| 7,065,494 B1 * | 6/2006 | Evans | .......................... | 705/7.32 |
| 8,489,438 B1 * | 7/2013 | Ibrahim | ....................... | 705/7.11 |
| 2002/0046041 A1 * | 4/2002 | Lang | ................................... | 705/1 |
| 2002/0107758 A1 * | 8/2002 | Takakura et al. | ............... | 705/26 |
| 2002/0107861 A1 * | 8/2002 | Clendinning et al. | ......... | 707/101 |
| 2002/0120491 A1 * | 8/2002 | Nelson | ............................ | 705/10 |
| 2002/0161664 A1 | 10/2002 | Shaya et al. | | |
| 2003/0033299 A1 * | 2/2003 | Sundaresan | ....................... | 707/5 |
| 2005/0004880 A1 | 1/2005 | Musgrove et al. | | |
| 2005/0010474 A1 * | 1/2005 | Desai | .............................. | 705/14 |
| 2005/0144333 A1 * | 6/2005 | Kotzin | ............................ | 710/15 |
| 2006/0059062 A1 * | 3/2006 | Wood et al. | ..................... | 705/35 |
| 2007/0143281 A1 * | 6/2007 | Smirin et al. | ..................... | 707/5 |

* cited by examiner

*Primary Examiner* — Ahmad Matar
*Assistant Examiner* — Jirapon Intavong
(74) *Attorney, Agent, or Firm* — Guntin & Gust, PLC; Jay H. Anderson

(57) ABSTRACT

A method and apparatus for sharing end user feedback is disclosed. An apparatus that incorporates teachings of the present disclosure may include, for example, a system can have a collection element that receives a vendor identifier and a measure of satisfaction associated therewith, and a storage element that stores the measure of satisfaction in a telephone directory of commercial vendors according to the vendor identifier. Additional embodiments are disclosed.

30 Claims, 3 Drawing Sheets

METHOD AND APPARATUS FOR SHARING END USER FEEDBACK

FIELD OF THE DISCLOSURE

The present disclosure relates generally to vendor, product or service recommendation systems, and more specifically to a method and apparatus for sharing end user feedback.

BACKGROUND

Word of mouth marketing has historically been an effective but difficult form of marketing for companies to execute. Research can show that consumers are more likely to make a purchase from a business or select a product if it is personally recommended.

Internet companies have consistently tried to capture recommendations or ratings to share on their websites. Most Internet companies require users to log on to a website, look up the product/service they want to recommend, and then submit a rating. This requires very proactive participation from the user and is not an efficient process.

Generally consumers are more likely to recommend a small business or product at the point they are actually experiencing it. For example, a consumer that enjoys a new restaurant is much more likely to recommend it immediately after the meal compared to adding a recommendation to a website the next time they are at their computer.

A need therefore arises for a method and apparatus for sharing end user feedback.

DETAILED DESCRIPTION

Embodiments in accordance with the present disclosure provide a method and apparatus for sharing end user feedback.

In a first embodiment of the present disclosure, a computer-readable storage medium in a system that manages a telephone directory of commercial vendors can have computer instructions for receiving a vendor identifier and a measure of satisfaction associated therewith, and storing the measure of satisfaction in the telephone directory according to the vendor identifier for presentation to one or more parties submitting a query for a commercial vendor listed in the telephone directory.

In a second embodiment of the present disclosure, a computer-readable storage medium in a messaging device can have computer instructions for selecting one among a plurality of vendor identifiers, receiving a measure of satisfaction associated with the selected vendor identifier, and transmitting to a system the vendor identifier and the measure of satisfaction for storing in a telephone directory of commercial vendors according to the vendor identifier.

In a third embodiment of the present disclosure, a system can have a collection element that receives a vendor identifier and a measure of satisfaction associated therewith, and a storage element that stores the measure of satisfaction in a telephone directory of commercial vendors according to the vendor identifier.

In a fourth embodiment of the present disclosure, a method can have the step of presenting contact information and a measure of satisfaction associated with a commercial vendor stored in a telephone directory of commercial vendors.

Figure 1:
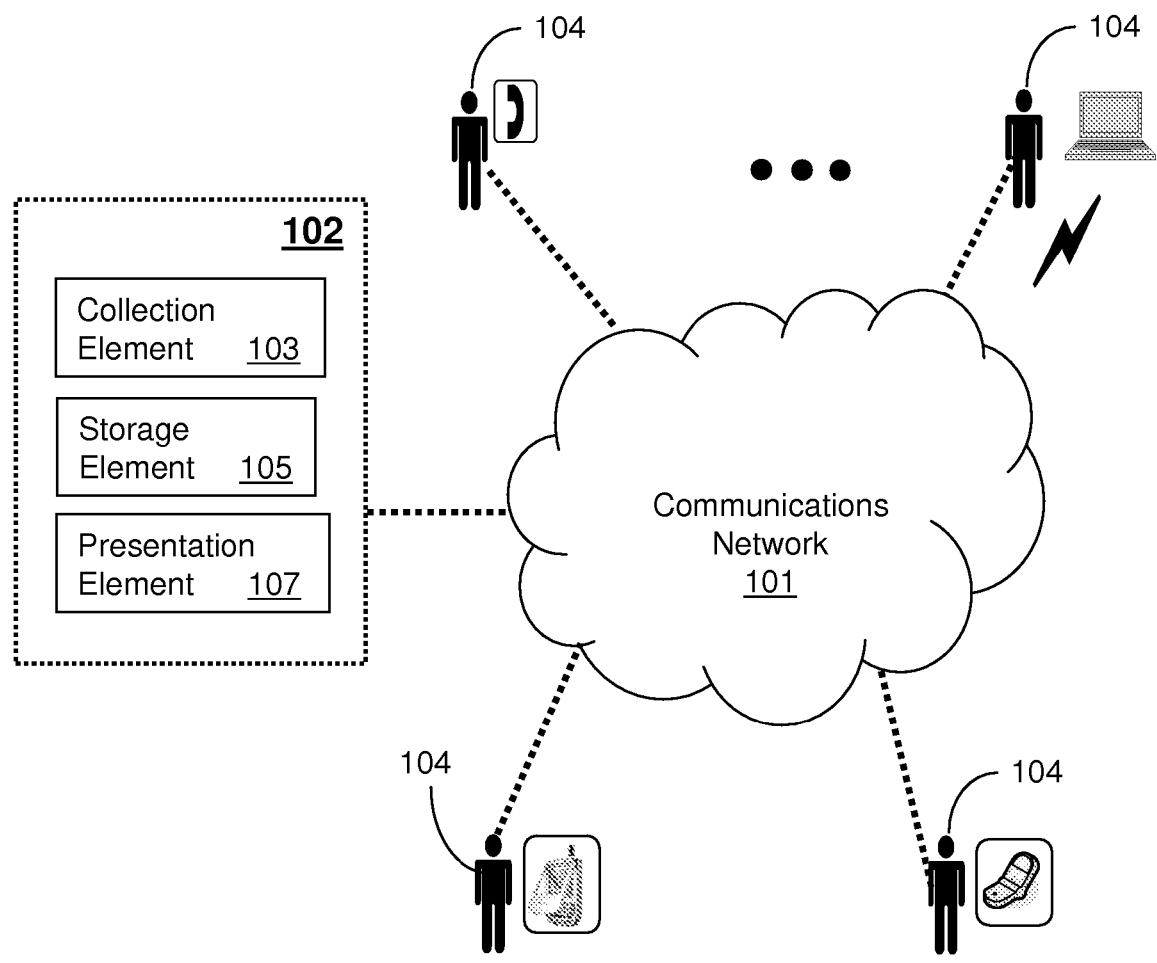
FIG. 1 depicts an exemplary embodiment of a communication system.

FIG. 1 depicts an exemplary embodiment of a communication system 100. The communication system 100 can comprise a communications network 101 that supports wireline and/or wireless communications for end users utilizing any number of potential messaging devices 104. Wireline communications can represent circuit-switched and/or packet-switched communications. In the case of circuit-switched communications the communications network 101 can support a public switched telephone network (PSTN) providing voice services to plain old telephone service (POTS) terminals. In the case of packet-switched communications, the communications network 101 supports voice, video and/or data services by way of xDSL or coax or fiber cable interfaces. The packet-switched services include without limitation Voice over IP (VoIP), IPTV and Internet communications.

For wireless messaging devices 104 such as a cell phone, a personal digital assistant (PDA), or a wireless computer, the communications network 101 can provide WiMax, WiFi, Bluetooth, or cellular voice and data telephony to end users. Any present or future cellular telephony protocol can be applied to the present disclosure such as GSM, UMTS, CDMA, EVDO, and so on. Future generation wireless technologies such as software defined radio (SDR) and ultra wide band (UWB) technologies can also be utilized by the communications network 101. The wireless services can utilize packet-switched as well as circuit-switched technology. Accordingly, some or all of the aforementioned wireline voice, video and data services can be supplied to roaming messaging devices 104 with wireless capability.

Considering the extensive wireline and wireless technologies possible, it would be evident to one of ordinary skill in the art that any wireline or wireless communication technology can be applied to the present disclosure.

The communication system 100 can further comprise a collection element 103, a storage element 105, and a presentation element 107 which singly or collectively operate as system 102 which can be used to manage a telephone directory service supplied to subscribers of the communication system 100. Elements 103, 105 and 107 can be utilized, for example, for collecting satisfaction ratings from end users by way of their messaging devices 104, storing said ratings, and presenting them to parties browsing the directory services provided by system 102. Elements 103-107 of system 102 can operate as software and/or hardware devices. For example, system 102 can represent singly or collectively a number of computing devices such as one or more scaleable servers. For illustration purposes only, system 102 will be referred to herein as a directory system 102.

Figure 2:
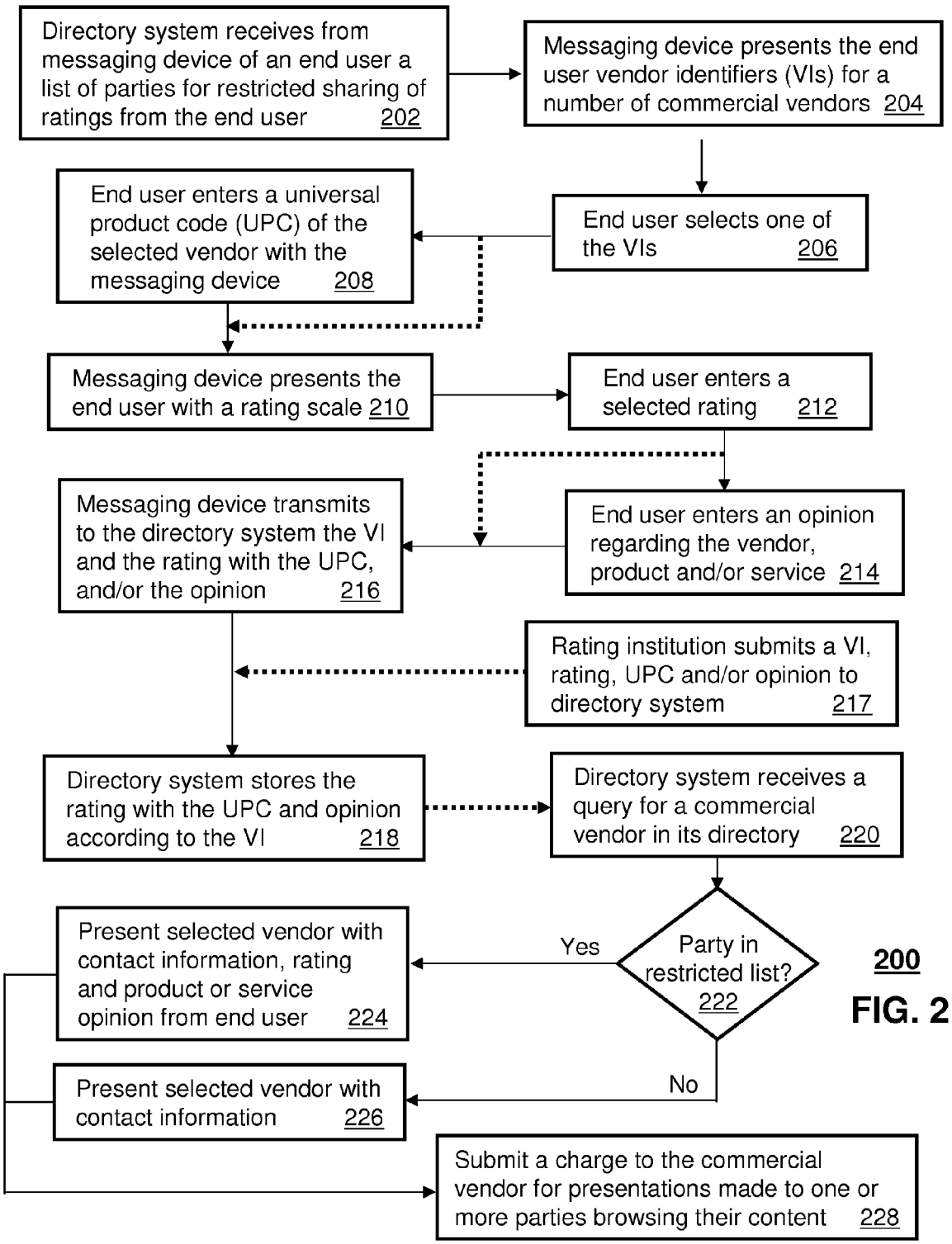
FIG. 2 depicts an exemplary method operating in the communication system.

FIG. 2 depicts an exemplary method 200 operating in portions of the communication system 100. Method 200 describes operations taking place between the directory system 102 and the messaging devices 104. With this in mind, method 200 begins with step 202 in which the directory system 102 receives from a messaging device 104 of an end sure a list of parties for restricted or limited sharing of vendor, product, and/or service ratings feedback provided by the end user. The list can be supplied over-the-air as an email, a short message service (SMS) text message, by wireline means, or a speech message interpreted by an interactive voice response (IVR) system operating in cooperation with the directory system 102 or as an integral part thereof.

The list of parties can be friends, family or other parties selected by the end user. The end user can supply more than one list thereby forming groups of parties. The list can comprise an identity for each party such as, for example, a caller ID corresponding to any number of messaging devices 104 (e.g., POTS, VoIP, cell phone, laptop, etc.). Alternatively, the ID of the party can be represented by an IP address, a user name and password, or any other form of identification which can be readily utilized by the directory system 102 as a means to authorize and authenticate a party as a member of a restricted list supplied by the end user. The end user can also share lists with other parties and vice-versa as a means for rapidly expanding his/her network of friends and family. The sharing process can be an over-the-air exchange between parties much like PDAs exchange contact lists with an infrared interface. Alternatively, the exchange can take place on-line by way of a website, or any other means of transferability.

In step 204 the end user can be presented upon request by way of a user interface (UI) operating in the messaging device 104 a list of commercial vendors and corresponding vendor identifiers (VIs). In step 206, the end user can select one of the VIs upon identifying a commercial vendor of interest. Alternatively, the end user can enter the commercial vendors name and thereby search and find a corresponding VI. The commercial vendors and corresponding VIs can be pre-stored in the messaging device 104 or can be retrieved remotely by way of the directory system 102 by wireline or wireless means. Steps 204-206 can represent a process in which an end user can retrieve at a desired moment a VI for a commercial vendor which the end user may be experiencing at the time of retrieval (e.g., after a meal at a restaurant, after purchasing a product from a retail merchant, while dealing with a financial services institution, etc.). Alternatively, the messaging device 104 presents a commercial vendor list without displaying the corresponding VIs. The VI remains associated with the commercial vendor selected by the end user in step 206 as the end user proceeds through steps 210-216 which will be described shortly.

In a retail product setting, the end user can in step 208 enter a universal product code (UPC) manually or automatically by way of a bar scanner or other form of image processor if available with the messaging device 104. If the end user is evaluating a service, step 208 can be skipped. In step 210, the messaging device 104 can be programmed to present the end user with a rating scale. The rating scale can represent, for example, a numbering system (1—very satisfied, 2—satisfied, 3—can go either way, 4—dissatisfied, and 5—very dissatisfied). Alternatively, the rating scale can have more or less options and additional complexity if desired. The rating scale can thus represent a measure of satisfaction furnished by the end user for a particular vendor, product and/or service.

Once the end user enters a rating selection in step 212, the end user can in a supplemental embodiment depicted by step 214 deliver by way of the messaging device 104 an opinion regarding the vendor, product and/or service. The opinion can be, for example, a text message entered by way of a Qwerty keypad of the messaging device 104, or a recorded speech message which can be played on demand. In less sophisticated embodiments, step 214 can be skipped. In step 216, the messaging device 104 can be programmed to transmit to the directory system 102 by wireline or wireless means the VI and the rating along with the UPC and/or the opinion (if available). As noted earlier the end user does not have to be aware of the VI corresponding to the commercial vendor selected in step 206. The directory system 102 in step 218 stores the rating with the UPC and opinion (collectively referred to herein as end user feedback) according to the VI. The VI can be used for selectively indexing and storing end user feedback in a telephone directory database of commercial vendors (like, for example, the Yellow Pages™) managed by the directory system 102.

Steps 202-216 can be applied to individual contributors of end user feedback such as the general public. Alternatively, measures of satisfaction can be supplied by profit or not-for-profit vendor rating institutions that rate commercial vendors. Some of these institutions can include for instance Consumer Reports, the Better Business Bureau, and so on. In step 217, such institutions can also provide the directory system 102 ratings about commercial vendors, ratings on products by UPC or other identifier, and/or opinions (collectively referred to herein as institutional feedback). As before, the directory system 102 can store this information in its database as described in step 218

Steps 202-218 can operate as a background process not readily visible to parties browsing commercial vendors in the telephone directory of the directory system 102 in accordance with steps 220-226. As a foreground process, the directory system 102 begins with step 220 where it receives a query for a commercial vendor in the telephone directory. In step 222, the directory system 102 checks whether the requesting party is in the restricted list supplied by the end user who created the list of parties (or friends and family) in step 202. If the requesting party is included in the list, the directory system 102 proceeds to step 224 where it presents to said party the selected commercial vendor with contact information, a rating from said end user, and a product (indexed by, for example, the UPC) or service opinion if available.

The opinion as noted earlier can be text or a recorded voice message from the end user (e.g., "I just had dinner at XYZ restaurant. It was a great experience. I highly recommend their XXX special"). If on the other hand the party is not on the end user's list, said party is presented in step 226 the selected commercial vendor with contact information only. Alternatively, in step 226 the requesting party can be presented an aggregate anonymous rating for the selected vendor. That is, parties who are not on an end user's list can still see an average rating from all parties submitting rating recommendations for commercial vendors. Specific opinions can be left out or presented anonymously. End user feedback or institutional feedback can be presented as separate feedback items to provide the requesting party several sources to compare feedback of the commercial vendor and products and/or services provided thereby. Alternatively, said end user and institutional feedback can be combined when the rating systems are similar. When the requesting party desires additional detail about an aggregate rating, the directory system 102 can present the sources of said ratings at the request of the requesting party.

Presentation steps 224-226 can be visual or audible. For instance, a common graphical user interface (GUI) can be presented at a messaging device 104 of the requesting party (e.g., a computer, PDA, or cell phone) during an Internet session by way of the communication network 101 that describes in text and/or graphics the items in step 224. Alternatively, the requesting party can receive an audible representation over one of the messaging devices 104 of FIG. 1 all or a portion of the items listed in step 224 by way of for example the IVR referred to earlier which can be directed by the directory system 102 or can be an integral part thereof.

The amount of information presented to the requesting party can be varied. For example, non-subscribers of the communication system 100 can be presented a limited view (or no view at all) of the end user and/or institutional feedback information managed by the directory system 102. Subscribers of the communication system 100 can be provided a full or varied view of end user and institutional feedback according to the number of services subscribed by them. For example, a subscriber who utilizes video, voice and data services of the communication system 100 can be given more information than one who is subscribed only to data. Thus, the feedback services of the directory system 102 can be versioned to requesting parties in accordance with the requesting parties' business affiliation with the service provider of the communication system 100.

From either of steps 224 and 226, the directory system 102 can be programmed to submit a charge to the commercial vendor for presenting their contact information to the requesting party. Alternatively, the commercial vendor can be charged a flat fee for being cited in the telephone directory. It would be apparent to an artisan with ordinary skill in the art that any billing method can be applied to the present disclosure for the presentation services described in method 200. It would also be apparent to said artisan that the aforementioned embodiments of method 200 operating in part in the directory system 102 can be presented by way of a website that supplies on-line services to the subscribers of the communication system 100.

There are many benefits that can be derived from the embodiments of method 200. For consumers, for example, method 200 provides a more efficient process for sharing recommendations on businesses and products than prior art system. Consumers seeking recommendations can locate vendors with more extensive data to make buying decisions. Since the process is more efficient and marketers can promote the recommendation of their products to the customer in person, method 200 can be used to collect more ratings than traditional prior art systems.

For businesses method 200 provides a low cost, efficient way to launch word of mouth marketing campaigns. The service provider of the directory system 102 can leverage in multiple ways the end user feedback collected thereby: (a) Business recommendations can be integrated into directory services (e.g., Yellow Pages™) to create a more "personalized" version of traditional directory listings. (b) The cumulative recommendations for a business can be integrated into a web page with additional detail on the business, including Pay Per Click/Call functionality.

The website can charge the business for features that drive consumers to their business. (c) Product recommendations can be integrated into shopping comparison engines, from which consumers can purchase the product. If a consumer knows that their friends recommend a particular computer, they will be much more likely to make that purchase. The website can benefit from affiliate revenues from said transactions. (d) Similar to (b) above, cumulative product recommendations can be integrated into more detailed web pages on the product. The website can thus charge the manufacturer for the ability to host this type of web page.

From the foregoing exemplary embodiments of FIGS. 1-2 it would be evident to an artisan with ordinary skill in the art that the present disclosure can be modified, reduced, or enhanced without departing from the scope and spirit of the claims described below. Accordingly, the reader is directed to the claims below for a fuller understanding of the breadth and scope of the present disclosure.

Figure 3:
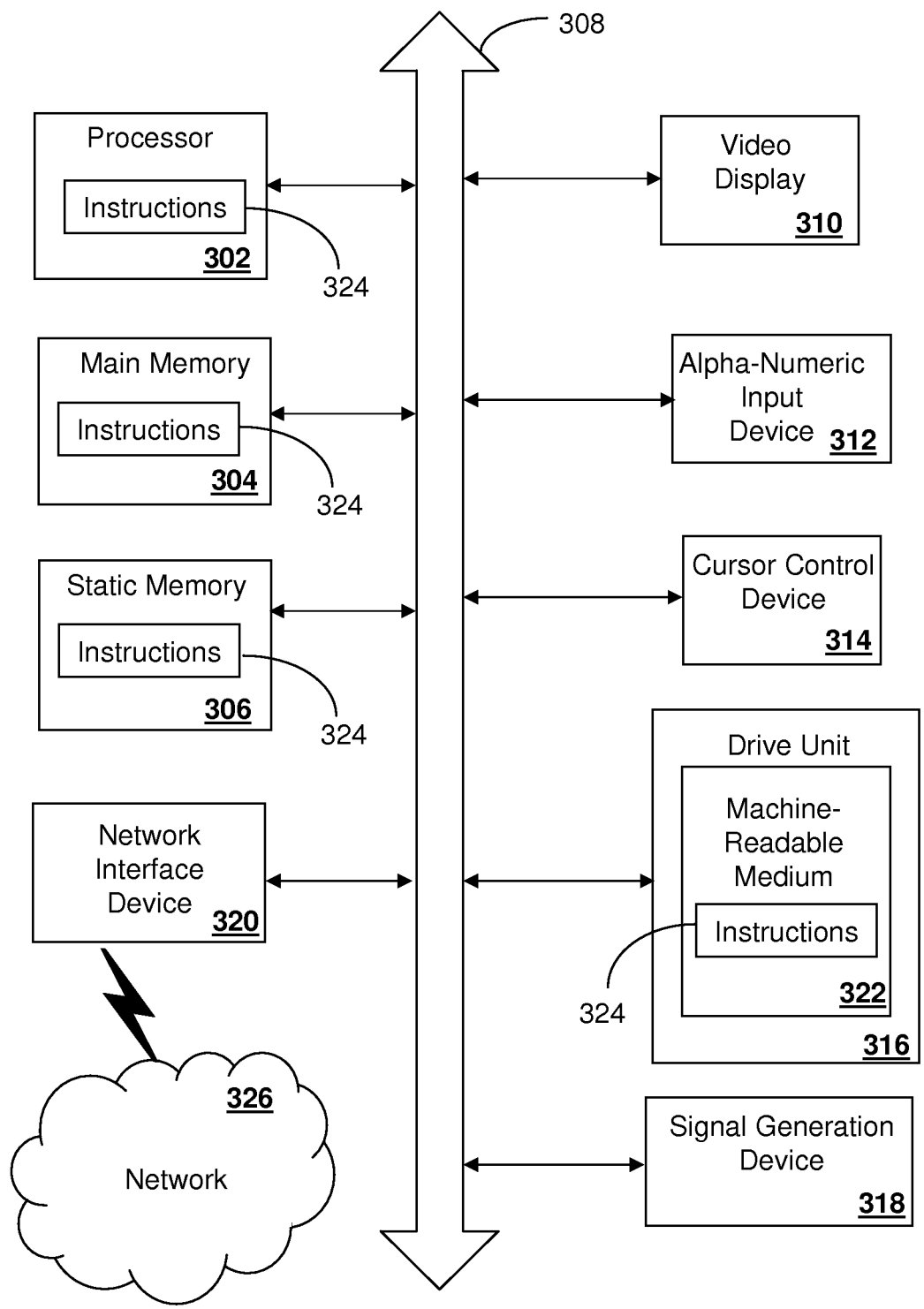
FIG. 3 depicts an exemplary diagrammatic representation of a machine in the form of a computer system within which a set of instructions, when executed, may cause the machine to perform any one or more of the methodologies disclosed herein.

FIG. 3 depicts an exemplary diagrammatic representation of a machine in the form of a computer system 300 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 300 may include a processor 302 (e.g., a central processing unit (CPU), a graphics processing unit (GPU, or both), a main memory 304 and a static memory 306, which communicate with each other via a bus 308. The computer system 300 may further include a video display unit 310 (e.g., a liquid crystal display (LCD), a flat panel, a solid state display, or a cathode ray tube (CRT)). The computer system 300 may include an input device 312 (e.g., a keyboard), a cursor control device 314 (e.g., a mouse), a disk drive unit 316, a signal generation device 318 (e.g., a speaker or remote control) and a network interface device 320.

The disk drive unit 316 may include a machine-readable medium 322 on which is stored one or more sets of instructions (e.g., software 324) embodying any one or more of the methodologies or functions described herein, including those methods illustrated above. The instructions 324 may also reside, completely or at least partially, within the main memory 304, the static memory 306, and/or within the processor 302 during execution thereof by the computer system 300. The main memory 304 and the processor 302 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 324, or that which receives and executes instructions 324 from a propagated signal so that a device connected to a network environment 326 can send or receive voice, video or data, and to communicate over the network 326 using the instructions 324. The instructions 324 may further be transmitted or received over a network 326 via the network interface device 320.

While the machine-readable medium 322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to email or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory computer-readable storage medium comprising instructions which when executed by a processor cause the processor to perform operations comprising:
   receiving from a messaging device of an end user a list of a first group of parties selected by the end user from a second group of parties, for restricted sharing by the first group of parties of a measure of satisfaction from the end user associated with a product or service of a vendor;
   receiving from the messaging device of the end user a vendor identifier for the vendor and the measure of satisfaction,
      wherein the processor operates in a communication system managing a directory service supplied to subscribers of the communication system and the end user is a subscriber of the communication system,
      wherein the measure of satisfaction is communicated to the directory service by way of a user interface of the messaging device and in accordance with a telephony protocol;
   storing the measure of satisfaction in a directory of the directory service according to the vendor identifier for presentation to equipment of the first group of parties,
      wherein the subscribers of the communication system comprise the second group of parties, wherein the list of the first group of parties is communicated to the directory service by the messaging device via email, text message, wireline, or a voice response system;
      wherein the measure of satisfaction comprises a rating selected by the end user and a narrative opinion of the end user,
      wherein the narrative opinion comprises a voice recording,
      wherein the narrative opinion is subject to the restricted sharing,
      wherein an aggregate rating based on ratings selected by a plurality of end users is accessible by the second group of parties; and
   providing the measure of satisfaction to a shopping comparison website for presentation subject to the restricted sharing.

2. The non-transitory computer-readable storage medium of claim 1, wherein the processor operates in a system managing a directory service and the end user is a subscriber to the directory service.

3. The non-transitory computer-readable storage medium of claim 2, wherein the operations further comprise receiving a product identity code corresponding to a product evaluated by the end user.

4. The non-transitory computer-readable storage medium of claim 3, wherein the product identity code comprises a universal product code.

5. The non-transitory computer-readable storage medium of claim 2, wherein the narrative opinion is based on the voice recording generated by user input at the messaging device by the end user.

6. The non-transitory computer-readable storage medium of claim 1, wherein the vendor identifier corresponds to a retail enterprise or a service enterprise.

7. The non-transitory computer-readable storage medium of claim 2, wherein the restricted sharing is defined by the end user that generated the narrative opinion.

8. The non-transitory computer-readable storage medium of claim 1, wherein the operations further comprise:
   billing the vendor associated with the vendor identifier if a purchase is made in association with the shopping comparison website.

9. The non-transitory computer-readable storage medium of claim 8, wherein the operations further comprise:
   receiving a product identity code corresponding to a product evaluated by the end user; and
   presenting to a requesting party in the first group of parties the measure of satisfaction with an identity of the end user, a time in which the measure of satisfaction was supplied by the end user, or the narrative opinion supplied by the end user.

10. The non-transitory computer-readable storage medium of claim 9, wherein the narrative opinion comprises a text message.

11. The non-transitory computer-readable storage medium of claim 8, wherein the operations further comprise editing a list of the first group of parties according to input supplied by the end user.

12. A non-transitory computer-readable storage medium comprising instructions which when executed by a processor cause the processor to perform operations comprising:
   selecting a vendor identifier from a plurality of vendor identifiers;
   receiving from a messaging device of an end user a list of a first group of parties selected by the end user from a second group of parties, for restricted sharing by the first group of parties of a measure of satisfaction from the end user relating to a product or service of a vendor associated with the selected vendor identifier;
   receiving the measure of satisfaction from the messaging device of the end user,
      wherein the measure of satisfaction is communicated to a directory service by way of a user interface of the messaging device and in accordance with a telephony protocol;
   transmitting to a communication system the selected vendor identifier and the measure of satisfaction for storing in a directory of commercial vendors of the directory service, according to the vendor identifier,
      wherein the processor operates in the communication system, the communication system manages the directory service, the directory service is supplied to subscribers of the communication system and an end user of the product or service is a subscriber of the communication system,
      wherein the subscribers of the communication system comprise the second group of parties, wherein the list of the first group of parties is communicated to the directory service by the messaging device via email, text message, wireline, or a voice response system;
      wherein the measure of satisfaction comprises a rating selected by the end user and a narrative opinion of the end user,
      wherein the narrative opinion is subject to the restricted sharing, and
      wherein an aggregate rating based on ratings selected by a plurality of end users is accessible by the second group of parties; and
   providing the measure of satisfaction subject to the restricted sharing to a commercial website selling the product or service of the vendor associated with the selected vendor identifier.

13. The non-transitory computer-readable storage medium of claim 12, wherein the instructions further comprise transmitting a product identity code corresponding to a product evaluated by the end user of the messaging device.

14. The non-transitory computer-readable storage medium of claim 13, wherein the product identity code comprises a universal product code, and wherein the operations further comprise identifying the universal product code of a select product.

15. The non-transitory computer-readable storage medium of claim 12, wherein the operations further comprise receiving from the end user of the messaging device a selected rating having an upper and lower range, wherein the selected rating corresponds to the measure of satisfaction.

16. The non-transitory computer-readable storage medium of claim 12, wherein the operations further comprise:
   billing the commercial website or the vendor if a purchase of the product or service is made in association with the commercial website.

17. The non-transitory computer-readable storage medium of claim 12, wherein the operations further comprise transmitting to the system a list identifying the first group of parties for sharing the narrative opinion of the measure of satisfaction, wherein the list is generated by the end user that provided the measure of satisfaction.

18. A system, comprising:
   a collection element that receives from a messaging device of an end user
      a list of a first group of parties selected by the end user from a second group of parties, for restricted sharing by the first group of parties of a measure of satisfaction from the end user associated with a product or service of a vendor,
      a vendor identifier for the vendor, and
      the measure of satisfaction,
      wherein the measure of satisfaction is communicated to a directory service by way of a user interface of the messaging device and in accordance with a telephony protocol; and
   a storage element that stores the measure of satisfaction in a directory of commercial vendors of the directory service, according to the vendor identifier,
      wherein the system manages a directory service supplied to subscribers of the directory service and the end user is a subscriber of the directory service,
      wherein the subscribers of the directory service comprise the second group of parties, wherein a list of the first group of parties is communicated to the directory service by the messaging device via email, text message, wireline, or a voice response system;

wherein the measure of satisfaction is provided subject to the restricted sharing to a commercial website selling the product or service of the vendor associated with the vendor identifier, wherein the measure of satisfaction comprises a rating selected by the end user and a narrative opinion of the end user, wherein the narrative opinion is subject to the restricted sharing, and wherein an aggregate rating based on ratings selected by a plurality of end users is accessible by the second group of parties.

19. The system of claim 18, wherein a billing invoice is provided to the commercial website or the vendor if a purchase of the product or service is made in association with the commercial website.

20. The system of claim 18, wherein the collection element receives a product identity code corresponding to the product or service where the product or service is evaluated by the end user, and wherein the product identity code comprises a universal product code.

21. The system of claim 18, wherein the end user defines the restricted sharing, and wherein the vendor identifier corresponds to a service enterprise.

22. The system of claim 19, further comprising a presentation element that receives from the end user a list identifying the first group of parties for restricted sharing of the narrative opinion of the measure of satisfaction.

23. The system of claim 22, wherein the presentation element receives from a requesting party of the first group of parties a query for the vendor associated with the vendor identifier, and presents to a requesting party of the first group of parties the measure of satisfaction.

24. The system of claim 23, wherein the collection element receives a product identity code corresponding to the product or service where the product or service is evaluated by the end user, and wherein the presentation element presents to the requesting party the measure of satisfaction with an identity of the end user and a time in which the measure of satisfaction was supplied by the end user.

25. The system of claim 22, wherein the presentation element receives an editing command from the end user for modifying the list of the first group of parties for restricted sharing of the narrative opinion of the measure of satisfaction.

26. The system of claim 19, comprising a billing element that submits a charge to the commercial vendor for presentations made to the first group of parties.

27. The system of claim 18, wherein the narrative opinion is generated based on a voice recording or a text message at the messaging device generated by the end user.

28. The system of claim 18, comprising a presentation element that determines a business affiliation between a service provider of the system and a party submitting a query for the vendor associated with the vendor identifier, and presents a response to said query according to said business affiliation.

29. A method, comprising:

receiving, by a system comprising a processor, vendor information from a messaging device of an end user of a product or service of the vendor, the vendor information being associated with a commercial vendor, the vendor information being generated by user input and communicated by way of a user interface of the messaging device and in accordance with a telephony protocol, the vendor information comprising a rating and a narrative opinion associated with the commercial vendor;

generating, by the system, a measure of satisfaction associated with the commercial vendor, the measure of satisfaction being based at least in part on the vendor information;

presenting, by the system, contact information and the measure of satisfaction associated with the commercial vendor stored in a directory of commercial vendors of a directory service supplied to subscribers of the directory service, wherein the system manages the directory service and the end user is a subscriber of the directory service; and providing, by the system, to a shopping comparison website the narrative opinion associated with the commercial vendor for presentation to a first group of parties selected by the end user from a second group of parties based on a restricted sharing policy to have access to the narrative opinion, wherein the subscribers of the directory service comprise the second group of parties, wherein a list of the first group of parties is communicated to the directory service by the messaging device via email, text message, wireline, or a voice response system;

wherein an aggregate rating based on ratings selected by a plurality of end users is accessible by the second group of parties.

30. The method of claim 29, further comprising billing, by the system, the vendor if a purchase of the product or service is made in association with the shopping comparison website, wherein the restricted sharing policy is generated by the end user, and wherein the narrative opinion is generated based on a voice recording or a text message by the end user.

* * * * *